(12) United States Patent
Sharpe

(10) Patent No.: US 6,578,469 B2
(45) Date of Patent: Jun. 17, 2003

(54) ELECTRONIC FRYING PAN SYSTEMS AND METHODS

(75) Inventor: Richard Sharpe, Woodridge, IL (US)

(73) Assignee: Digital Cookware, Inc., Woodridge, IL (US)

( * ) Notice: Subject to any disclaimer, the term of this patent is extended or adjusted under 35 U.S.C. 154(b) by 0 days.

(21) Appl. No.: 09/837,684

(22) Filed: Apr. 18, 2001

(65) Prior Publication Data

US 2001/0032546 A1 Oct. 25, 2001

Related U.S. Application Data

(60) Provisional application No. 60/197,756, filed on Apr. 19, 2000, provisional application No. 60/203,293, filed on May 11, 2000, provisional application No. 60/212,169, filed on Jun. 16, 2000, and provisional application No. 60/260,038, filed on Jan. 5, 2001.

(51) Int. Cl.[7] ............. A47J 27/00; G01K 1/02; G01K 1/14; G01K 7/08
(52) U.S. Cl. ............. 99/342; 99/422; 99/343; 374/141; 374/180
(58) Field of Search ............. 99/342, 343, 344, 99/422; 374/141, 142, 179, 180, 149

(56) References Cited

U.S. PATENT DOCUMENTS 2,750,916 A * 6/1956 Hanington ............. 99/343
5,265,522 A * 11/1993 Schultz ............. 99/343
5,441,344 A * 8/1995 Cook, III ............. 374/141
5,934,181 A * 8/1999 Adamczewski ............. 374/141
5,983,783 A * 11/1999 Archard et al. ............. 99/342
6,206,564 B1 * 3/2001 Adamczewski ............. 374/141

* cited by examiner

Primary Examiner—Reginald L. Alexander
(74) Attorney, Agent, or Firm—Curtis A. Vock; Lathrop & Gage L.C.

(57) ABSTRACT

A digital frying pan provides temperature and/or food doneness information associated with food cooked within the pan. A thermal sensor coupled with the pan senses temperature and generates corresponding signals, and processing electronics coupled with the sensor convert the signals to data for display on a LCD. A warning buzzer or LED warns the user of completed cooking. The frying pan may be programmed to desired food types or personal temperatures or food doneness options. The invention also provides a remote sensing food doneness system for remotely viewing and then determining food temperature and/or food doneness. The remote system uses thermal imaging optics and thermal sensing techniques to remotely sense food temperature. Preferably a second optical element images the food onto a CCD to display an image of the food to a user. The system is mounted by a user who views the CCD to ensure appropriate placement in line of sight from the food. A warning is generated by the system to indicate food doneness or desired temperature.

15 Claims, 5 Drawing Sheets

FIG. 4
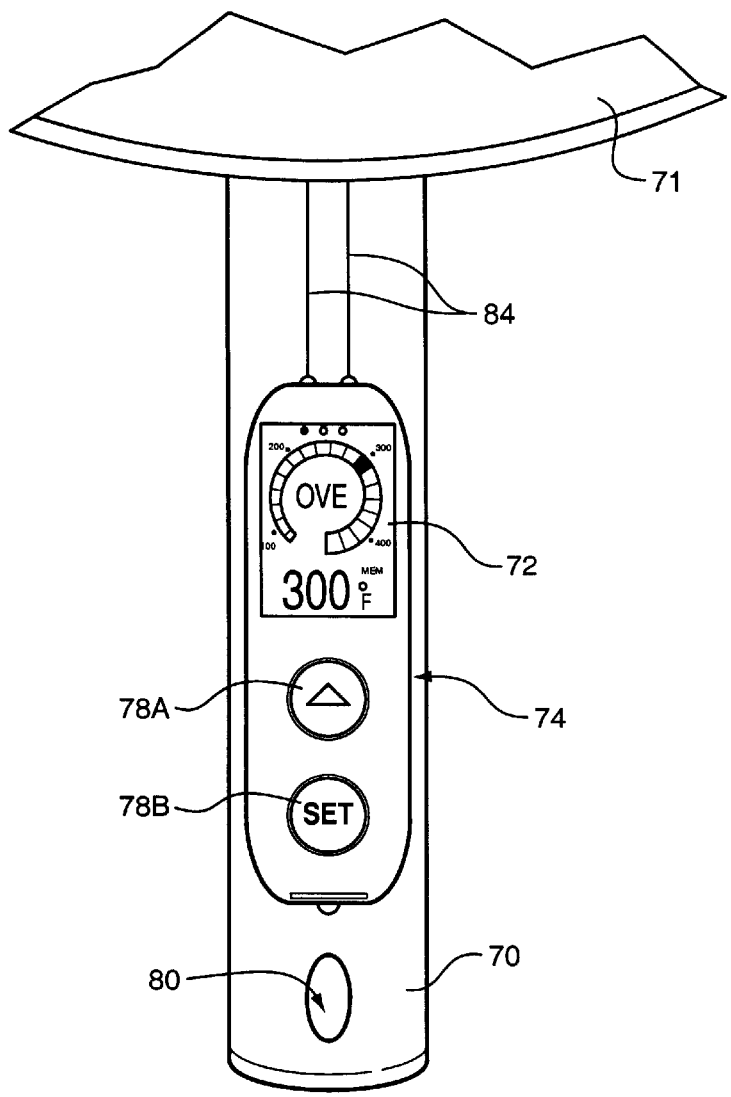
FIG. 4A
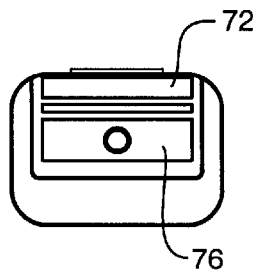
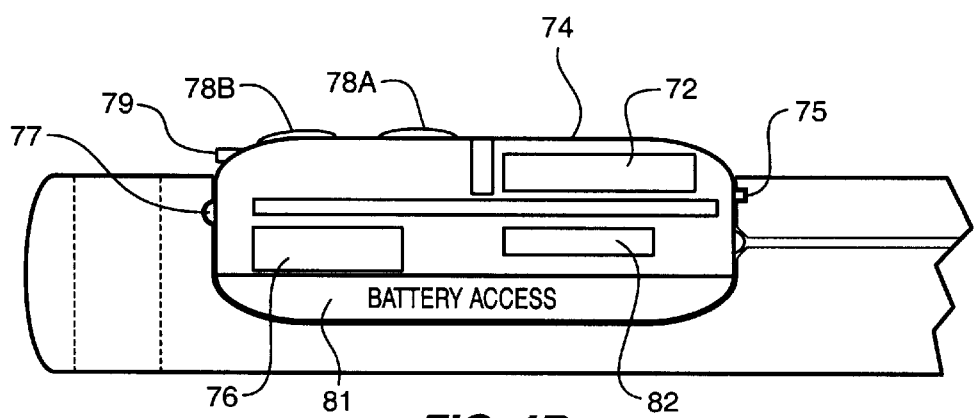
FIG. 4B

ELECTRONIC FRYING PAN SYSTEMS AND METHODS

RELATED APPLICATIONS

This application claims priority to U.S. Provisional Application No. 60/197,756, filed Apr. 19, 2000; to U.S. Provisional Application No. 60/203,293, filed May 11, 2000; to U.S. Provisional Application No. 60/212,169, filed Jun. 16, 2000; and to U.S. Provisional No. 60/260,038, filed Jan. 5, 2001, each of which is expressly incorporated herein by reference.

BACKGROUND

Cooking over stove and fire has been an age-old occurrence. Assistance in cooking is desirable, such as to assure food temperature and doneness. Cooking pans are used in cooking—but provide no assistance in monitoring food temperature or doneness. One object of the invention is to provide an electronic frying pan to overcome the deficiencies of the prior art. Other objects will be apparent in the description that follows.

SUMMARY OF THE INVENTION

In one aspect, the invention provides an electronic frying pan with a thermally conductive pan for cooking food and a handle connected to the thermally conductive pan. The thermally conductive pan has one or more sensors attached therewith (e.g., inside or outside) to generate signals indicative of one or more characteristics (e.g., temperature) of the pan or food within the pan; the handle has electronics connected to the sensors for providing indications to a user of the frying pan regarding food cooked within the pan. Preferably, the handle electronics may be removed from the handle, and later replaced, so as to wash the pan without exposing the handle electronics to washing environments. The handle electronics preferably have a display to show desired information, e.g., food temperature, to the user. Preferably, a processor is included with the handle electronics to process signals from the sensors to provide food characteristics, e.g., doneness. Sensitive electronics are preferably included within the handle electronics, and the handle electronics are preferably thermally shielded from frying temperatures in the pan, so as to protect electronic components. User inputs to the processor (i.e., via the handle electronics) provide for selecting doneness (e.g., "well-done") and food type (e.g., meat, poultry, eggs) options.

In one aspect, the invention includes a digital frying pan, sensor electronics and a LCD display. The sensor electronics convert an analog sensor signal (for example, indicating pan temperature) into a digital signal for display at the LCD display of temperature in either Fahrenheit or Centigrade. A user of the digital frying pan preferably reads the display when facing the handle, and thus the display is preferentially oriented for this view. The information displayed preferably changes as pan or food temperature changes. In addition the display also preferably provides an analog representation of temperature, such as a bar graph. In one aspect, at least part of the sensor electronics are contained within removeable module, such that the module may be removed during washing of the digital frying pan so as not to damage sensitive electronics. In another aspect, the LCD display is also incorporated into the removeable module.

In yet another aspect, the invention provides a remote food doneness system. The system couples with a wall or other surface and has a line of sight to cooking food such as within a frying pan. The system includes optics and one or more thermal sensing detectors; the optics image the cooking food to the thermal sensing detectors; and processing electronics within the remote food doneness system process signals from the detectors to determine food characteristics, e.g., temperature. In one embodiment, a processor and memory within the remote food doneness system stores information such as food items (e.g., eggs, chicken, beef) and corresponding food doneness and temperature settings. A user interface permits a user of the system to select food doneness options. The system preferably includes an audible or visual indicator to warn of programmed events, e.g., when food viewed by the system has reached desired temperatures or doneness. The system in one embodiment, for example, may thus "view" cooking eggs and warn a user desiring the eggs that the eggs are "over easy".

In one aspect, an electronic frying pan system is provided. The system includes a pan for cooking food and a handle connected to the pan for manipulating the pan. One or more temperature sensors connect with the pan to generate signals indicative of one or more characteristics of the pan, such as temperature. Indication electronics disposed with the handle connect with the sensors and disposed to provide at least one indication of the characteristics to a user of the pan.

In one aspect, the indication electronics includes a liquid crystal display to display the one or more characteristics to the user. By way of example, pan temperature is relayed to the user. Pan temperature of one aspect is calibrated to a food temperature as the food is generally not directly adjacent to a temperature sensor.

In one aspect, the indication electronics include a processor to process the signals to associate food characteristics corresponding to food cooking within the pan. Food characteristics can include food doneness.

In another aspect, a user interface is included with the frying pan to provide for selecting one of several food types, such that the processor generates food characteristics as a function of food type. Similarly, food temperatures may be selected in another aspect.

In a preferred aspect, the indication electronics are detachable and alternatively attachable with the handle, such that the pan may be washed without the indication electronics.

In still another aspect, the indication electronics have voice synthesis electronics to speak at least the one indication to the user.

Preferably, the indication electronics include a memory element for storing food doneness versus temperature settings for one or more food types.

In yet another aspect, an audible alarm is coupled with the indication electronics to audibly inform a user of the pan system of one of temperature and food doneness of food within the pan.

In one aspect, the indication electronics include a calibration memory to couple the indication electronics with a plurality of different size pans, such that the indication electronics provide calibrated information for the different size pans.

The invention of another aspect provides a method of cooking food in a frying pan, including the steps of: sensing temperature of the frying pan, processing pan temperature to determine one or more of food doneness and food temperature, and informing a user of the pan of the food doneness and/or food temperature.

The method can also include the steps of decoupling processing electronics from the frying pan prior to washing the pan and alternatively coupling the processing electronics with the frying pan prior to use.

The method can also include the steps of decoupling processing electronics from the frying pan and coupling the processing electronics with a second pan having a different size from the frying pan, and selecting calibration data within the processing electronics to provide calibrated information for the different size second pan.

In another aspect, the invention provides a method of remotely monitoring. temperature of food, including the steps of: imaging the food onto a thermal sensor, processing signals from the thermal sensor to determine a temperature of the food, and informing the user of the temperature.

The method of this aspect preferably includes the step of attaching a housing coupled with the sensor to a surface in line of sight from the food.

In yet another aspect, the method includes the further step of imaging the food onto a CCD to display an image of the food to the user so as to physically arrange appropriate mounting of the housing to image the food onto the thermal sensor.

The invention of one aspect calibrates a thermal sensor arranged to sense temperature at the side of the pan. Since the side of the pan generally has a different temperature than the center of the pan, where food cooks, the invention calibrates the temperature taken at the side of the pan to correlate to the center of the pan. Software with the electronics module provides smoothing of the data based on rate of change of temperature at the side of the pan. This provides an average rate of change usable to compensate for temperatures in the pan center.

The invention is next described further in connection with preferred embodiments, and it will become apparent that various additions, subtractions, and modifications can be made by those skilled in the art without departing from the scope of the invention.

BRIEF DESCRIPTION OF ILLUSTRATED EMBODIMENTS

A more complete understanding of the invention may be obtained by reference to the drawings, in which.

Figure 5:
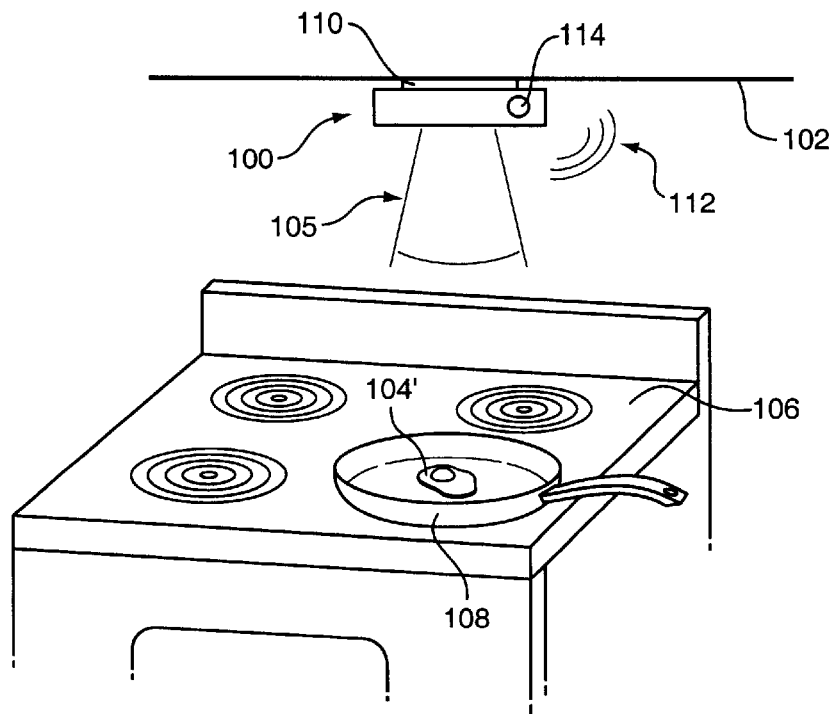
Figure 6:
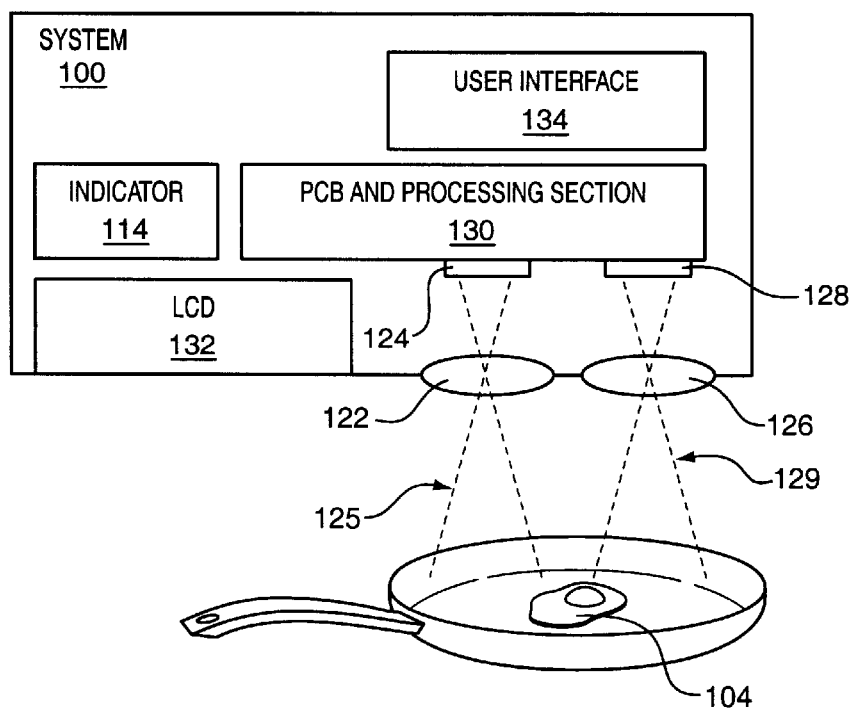

FIG. 4 shows one electronics handle of the invention; FIG. 4A shows an end view of the handle of FIG. 4; FIG. 4B shows a cross-sectional side view of the handle of FIG. 4;

FIG. 5 shows one remote food doneness system constructed according to the invention; and FIG. 6 schematically shows an electronic block diagram of the system of FIG. 5.

DETAILED DESCRIPTION OF THE PREFERRED EMBODIMENT

Figure 1:
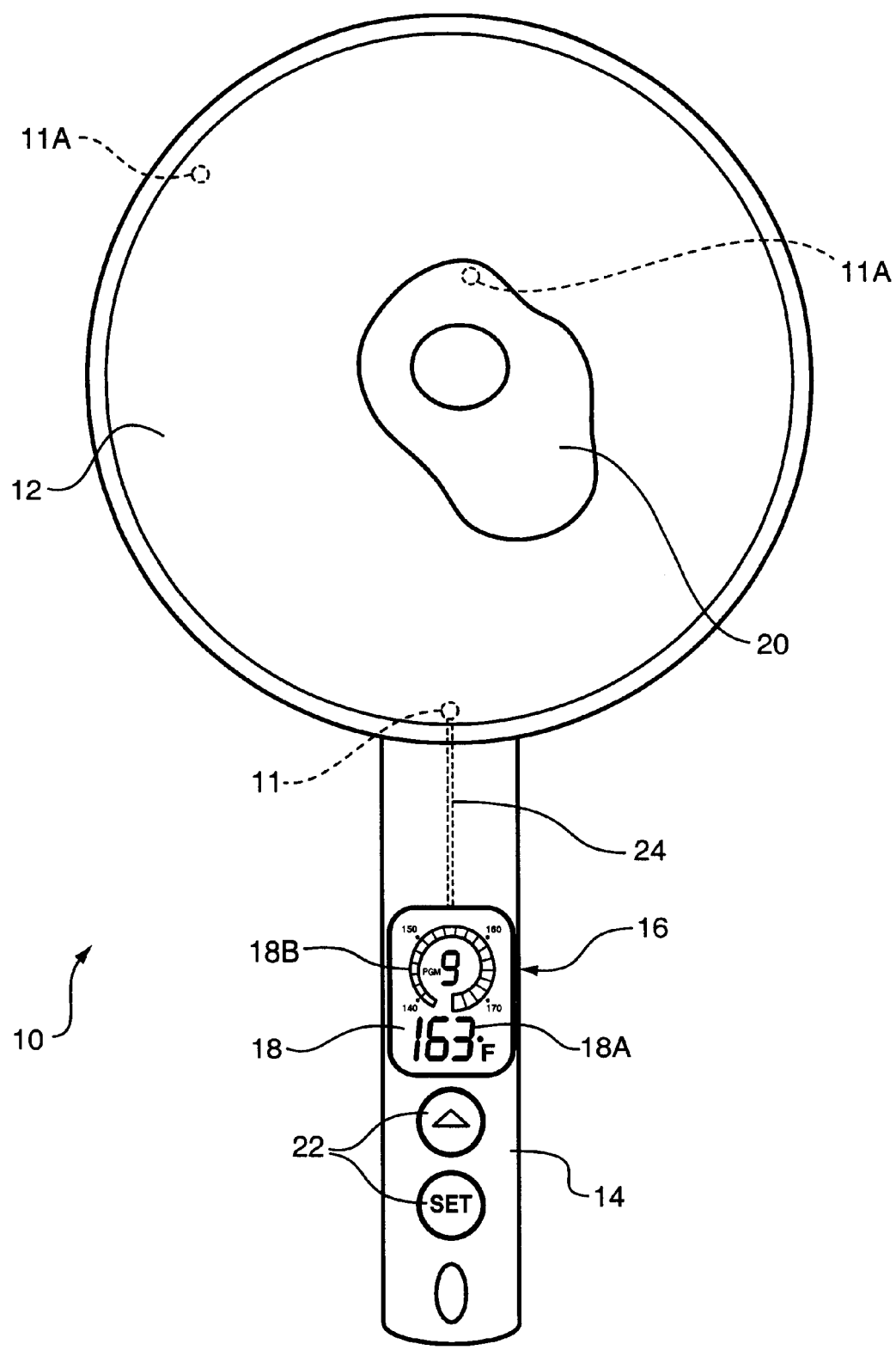
FIG. 1 shows one electronic frying pan constructed according to the invention.

FIG. 1 shows an electronic frying pan 10 constructed according to the invention with (a) a thermally conductive pan 12 and (b) a handle 14. One or more temperature sensors 11 coupled with pan 12 connect to an electronics module 16 in handle 14. Electronics module 16 preferably includes display 18 to show a user of pan 10 characteristics associated with pan 12 or food (in the form of an egg) 20 within pan 12. Electronics module 16 includes a processor such as a microprocessor and preferably includes memory to store food doneness options and user selections. A user interface 22 provides for user input to select various characteristics and functions of electronics module 16. Display 18 may show digital temperature 18a, a bar graph representation 18b of temperature or doneness, or other information. As described below, electronics module 16 preferably detaches from pan 10 so that pan 10 is washable without module 16 attached thereto. Teflon wires preferably seal the remaining portions of handle 14 to prevent liquids from entering electronics remaining after removal of module 16.

Temperature sensors 11 include, for example, a thermistor or thermocouple. Thermocouple 11 couples to electronics module 16 via electronic or thermal conductive path 24; path 24 is chosen as a matter of design choice as a medium to transfer data or signals from sensor 11 to module 16. Preferably, stainless steel is used to provide contact between module 16, path 24 and sensors 11. FIG. 1 shows one temperature thermocouple 11 coupled with conductive pan 12, though additional sensors 11 may be placed about pan 12 as a matter of design choice. For example, one or more additional temperature sensors may be placed at different locations 11a; sensors at locations 11a also connect to module 16 and may provide more representative temperature data for food 20. Any temperature sensor 11 may be calibrated to correspond to a temperature profile experienced by food 20, even though sensor 11 is not directly adjacent food 20. Typical pan calibrations are for pans that are eight, ten or twelve inches in diameter.

In operation, a user of pan 10 selects pre-programmed temperature settings or programs personal settings to cook food 20 in a desired manner. For example, such a user may select 300 degrees F. for eggs, 340 degrees F. for bacon, 360 degrees F. for burgers and pork chops, 380 degrees F. for pancakes, and 400–420 degrees F. for steak. Other options are of course available without departing from the scope of the invention. In the preferred embodiment, display 18 displays the temperature of pan 12 in Centigrade or Fahrenheit. Various cooking levels are preferably selectable at handle 14. When a cooking level is selected, a microprocessor in module 16 provides a signal converted to display 18 that informs the user that the temperature is at his desired chosen cooking level.

Figure 2:
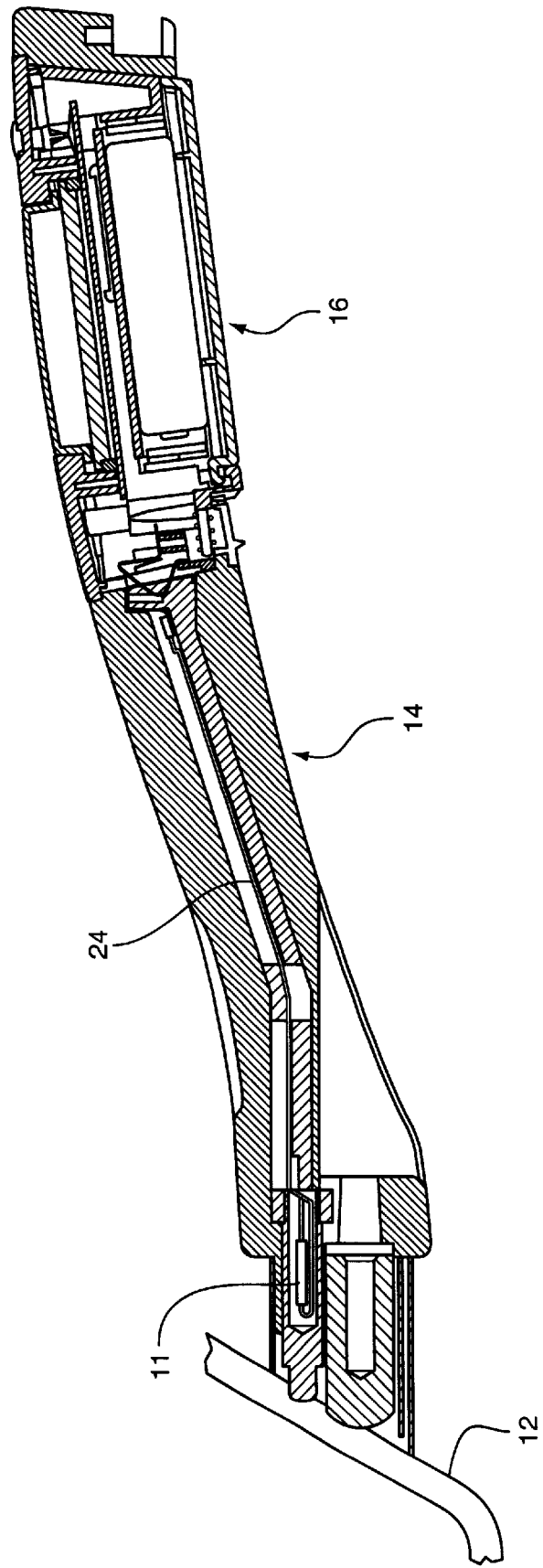
FIG. 2 shows a partial cross-sectional view of the handle and pan of FIG. 1.

FIG. 2 shows a partial cross-sectional view of pan 10 of FIG. 1. Those skilled in the art should appreciate that the mechanical design of pan 10 is a matter of design choice and that other configurations may be functionally arranged without departing from the scope of the invention.

Figure 3:
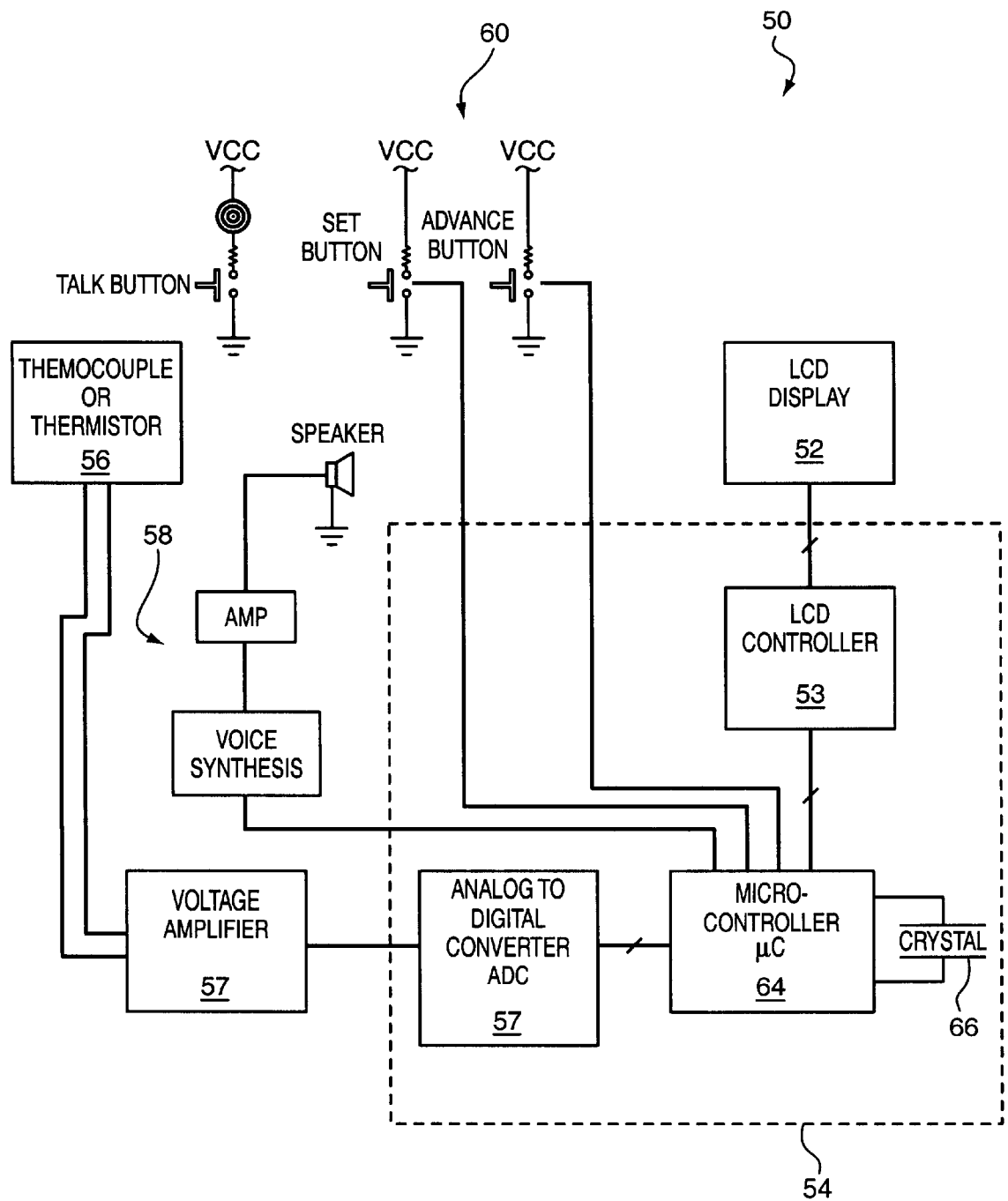
FIG. 3 shows one block diagram of circuitry suitable for use with an electronic pan of FIG. 2.

FIG. 3 schematically illustrates circuitry 50 suitable for use with frying pan 10 of FIG. 1. An LCD display 52 may for example be used as display 18; an LCD controller 53 generally controls display 52 as known in the art. Dotted line 54 indicates one practical partitioning of components of circuitry 50 that may be conveniently contained within one package. A thermocouple or thermistor 56 may serve in function as one of the sensors 11 to generate signals concerning characteristics of the pan and/or food within pan 12. A voltage amplifier 57 may be used to boost sensor signals, as desired or needed. An A-D converter 59 is generally used when sensor 56 drives an analog signal. In one embodiment, the handle electronics module can include voice synthesis electronics 58 used to capture human voice commands for pan or food characteristics made by a user of pan 10. Normally, however, users input instructions to circuitry 50 via input buttons 60 (e.g., for user interface buttons 22, FIG. 1) so as to select desired food or doneness characteristics. A microcontroller 64 provides for overall function and command intelligence of circuitry 50; for example microcontroller 64 adjusts cooking time based on surface temperature of pan 12, FIG. 1. A crystal 66 provides for timing in circuitry 50.

FIGS. 4, 4A, 4B show one handle 70 constructed according to the invention and suitable for use an electronic frying pan 71 (shown only partially, for purposes of illustration) such as pan 10, FIG. 1. A display 72 shows food or pan characteristics. Preferably the handle electronics are in the form of a removable control module 74, as shown; a module alignment nub 75, ball snap 77, and lip 79 may be used to facilitate removing from, and alternatively replacing module 74 within, handle 70. A battery 76, e.g., a 2450 Lithium battery, fits within handle 74; battery 76 may be removed from module 74 via access door 81. User interface buttons 78a, 78b provide for "advance" and "set" menu options, respectively. A hang hole 80 permits hanging of handle 70 on a hook. A warning buzzer 82 provides an audible warning of programmed food doneness sensed by temperature sensors coupled with module 74 via communications lines 84.

The invention thus provides several advantages. By way of example, eggs are one food difficult to cook with certainty as to whether they are well done, over easy or medium. The invention provides for recalling temperature for desired egg doneness; and a user need not rely on stove temperature settings. The microcontroller of the preferred embodiment automatically signals the user (e.g., via buzzer 82, FIG. 4) when the desired egg doneness is reached. Since the display can include an analog representation of doneness, e.g., via a bar graph or tachagraphic display, then the user may also watch food approach the desired doneness, so as not to be surprised. User selections at the user interface (e.g., by pressing button 22, FIG. 1) provide for selecting doneness options (e.g., over easy) and food types (e.g., eggs); or a user can select custom temperatures. In a further advantage, the replaceable module (e.g., module 16, FIG. 1) may be used in an array of pans of different size—but with a common electronics module. When the module is coupled with a certain pan size, the user preferably sets pan size through the same user interface so as to adjust any calibrations to temperature sensors with the particular pan.

FIG. 5 shows a remote food doneness system 100 constructed according to the invention. System 100 is constructed and arranged to attach to surfaces 102 near to cooking food 104, such as food on stove 106 and within frying pan 108. By way of example, system 100 attaches to surface 102 via magnets 110 coupled with system 100; surfaces 102 are typically metallic surfaces that are part of stove 106. In operation, system 100 views food 104 through a field of view 105; system 100 then monitors food doneness and/or temperature of food 104 to provide an indication 112 of doneness and/or temperature to a user. Typically, indication 112 is an audible sound or light made, respectively, from a speaker or LED 114. System 100 thus provides operation similar to the digital frying pans of FIGS. 1–4; however system 100 functions remotely from food 104.

FIG. 6 shows a block schematic of system 100; those skilled in the art should appreciate that elements of system 100, as shown in FIG. 6, may be arranged in different ways, or through different components, without departing from the scope of the invention. An infrared optically powered element (e.g., a mirror or Germanium lens) 122 images food 104 onto a thermal detector 124 (e.g., a bolometer), as shown by optical imaging lines 125. A visible optically powered element (e.g., a quartz lens) 126 images food 104 onto a CCD array 128, as shown by optical imaging lines 129. A PCB and processing section 130 converts signals from CCD array 128 to data for LCD 130; PCB and processing section 130 converts signals from thermal detector 124 to temperature data indicating a temperature of food 104; a user may view LCD 132 to view what food 104 system 100 monitors; specifically, by reviewing LCD 132 a user may position system 100 appropriately on surface 102 so as to appropriately image food 104 to thermal detector 124. A user interface provides for inputting selections for temperature and food doneness to system 100; preferably PCB and processing section 130 includes memory to store food doneness options and food types, similar to system described above in FIGS. 1–4. Once a selected temperature or food doneness is reached, for food 104, system 100 informs the user of this through indicator 114 (e.g., a buzzer or LED). In this way, a user of system 100 can monitor food doneness and temperature for a food remotely and conveniently. As those skilled in the art understand, determining temperature of food 104 via thermal detectors works best when a reference temperature is available; thus preferably thermal detector 124 includes at least two detectors, one to receive thermal energy from food 104 and one to receive thermal energy from a reference temperature such as the inside of system 100, which is generally at room temperature. Data from the two detectors 124 may then be compared (in PCB and processing section 130) to determine temperature of food 104. Other calibration techniques for determining absolute temperature may also be used.

Those skilled in the art should appreciate that system 100 can utilize a single infrared CCD to provide both imaging for LCD display 130 and temperature monitoring of food 104. In such an embodiment, separate lens 126 and CCD array 128 are not necessary.

The invention thus attains the objects set forth above, among those apparent from the preceding description. Since certain changes may be made in the above methods and systems without departing from the scope of the invention, it is intended that all matter contained in the above description or shown in the accompanying drawing be interpreted as illustrative and not in a limiting sense. It is also to be understood that the following claims are to cover all generic and specific features of the invention described herein, and all statements of the scope of the invention which, as a matter of language, might be said to fall there between.

Having described the invention,
What is claimed is:
1. An electronic frying pan system, comprising:
a pan for cooking food;
a handle connected to the pan for manipulating the pan;
one or more temperature sensors connected with the pan for generating signals indicative of one or more characteristics; and
indication electronics connected with the sensors and disposed with the handle for provding at least one indication of the characteristics to a user of the pan,
wherein the indication electronics comprise a processor for processing the signals to associate food characteristics corresponding to food cooking within the pan,
wherein the indication electronics comprise a user interface for selecting one of several food temperatures, wherein the processor generates food characteristics as a function of food temperature.

2. A pan system of claim 1, wherein the indication electronics comprise a liquid crystal display for displaying the one or more pan characteristics to the user.

3. A pan system of claim 1, wherein the one or more pan characteristics comprise pan temperature.

4. A pan system of claim 1, wherein the food characteristics comprise food doneness.

5. A pan system of claim 1, wherein the indication electronics comprise a user interface for selecting one of several food types, wherein the processor generates food characteristics as a function of food type.

6. A pan system of claim 1, wherein the indication electronics are detachable and alternatively attachable with the handle, wherein the pan may be washed without the indication electronics.

7. A pan system of claim 1, wherein the indication electronics comprise voice synthesis electronics to speak at least the one indication to the user.

8. A pan system of claim 1, wherein the indication electronics comprise memory for storing food doneness as a function of food temperature for one or more food types.

9. A pan system of claim 4, further comprising an audible alarm coupled with the indication electronics for audibly informing a user of the pan system of one of food temperature and food doneness of food within the pan.

10. An electronic frying pan system, comprising:

a pan for cooking food;

a handle connected to the pan for manipulating the pan;

one or more temperature sensors connected with the pan for generating signals indicative of one or more pan characteristics; and indication electronics connected with the sensors and disposed with the handle for providing at least one indication of the pan characteristics to a user of the pan, wherein the indication electronics comprise calibration memory for coupling the indication electronics with a plurality of different size pans, wherein the indication electronics provide for the different size pans a temperature profile of a pan corresponding to a measured pan temperature.

11. An electronic frying pan system, comprising:

a pan for cooking food;

a handle;

a temperature sensor thermally connected with the pan for generating a signal indicative of a pan temperature;

a processor connected to the sensor for processing the signal to calculate a measured pan temperature, the processor being calibrated for a location of the sensor and for a pan size;

a user interface for selecting and for displaying at least one of a selected food and a selected pan temperature, and for displaying the measured pan temperature; and a removable module, the removable module comprising the processor and the user interface and being disposed within the handle, the module being removable from the handle by a user.

12. A system as in claim 11 wherein the sensor is located proximate to an edge of the pan and the processor can be calibrated by a user.

13. A system as in claim 11 wherein the removable module is interchangeable for use in a plurality of different-sized pans.

14. A system as in claim 11 wherein the processor automatically audibly informs the user when the selected pan temperature obtains.

15. A system as in claim 11 wherein the user interface displays the measured pan temperature as the measured pan temperature changes.

* * * * *